(No Model.) 2 Sheets—Sheet 1.

C. JONES.
HYDRANT, STOP VALVE, OR THE LIKE.

No. 601,967. Patented Apr. 5, 1898.

Witnesses
C. C. Burdine
D. E. Burdine

Inventor:
Charles Jones,
by Dodge and Sons
Attys.

(No Model.) 2 Sheets—Sheet 2.
C. JONES.
HYDRANT, STOP VALVE, OR THE LIKE.
No. 601,967. Patented Apr. 5, 1898.
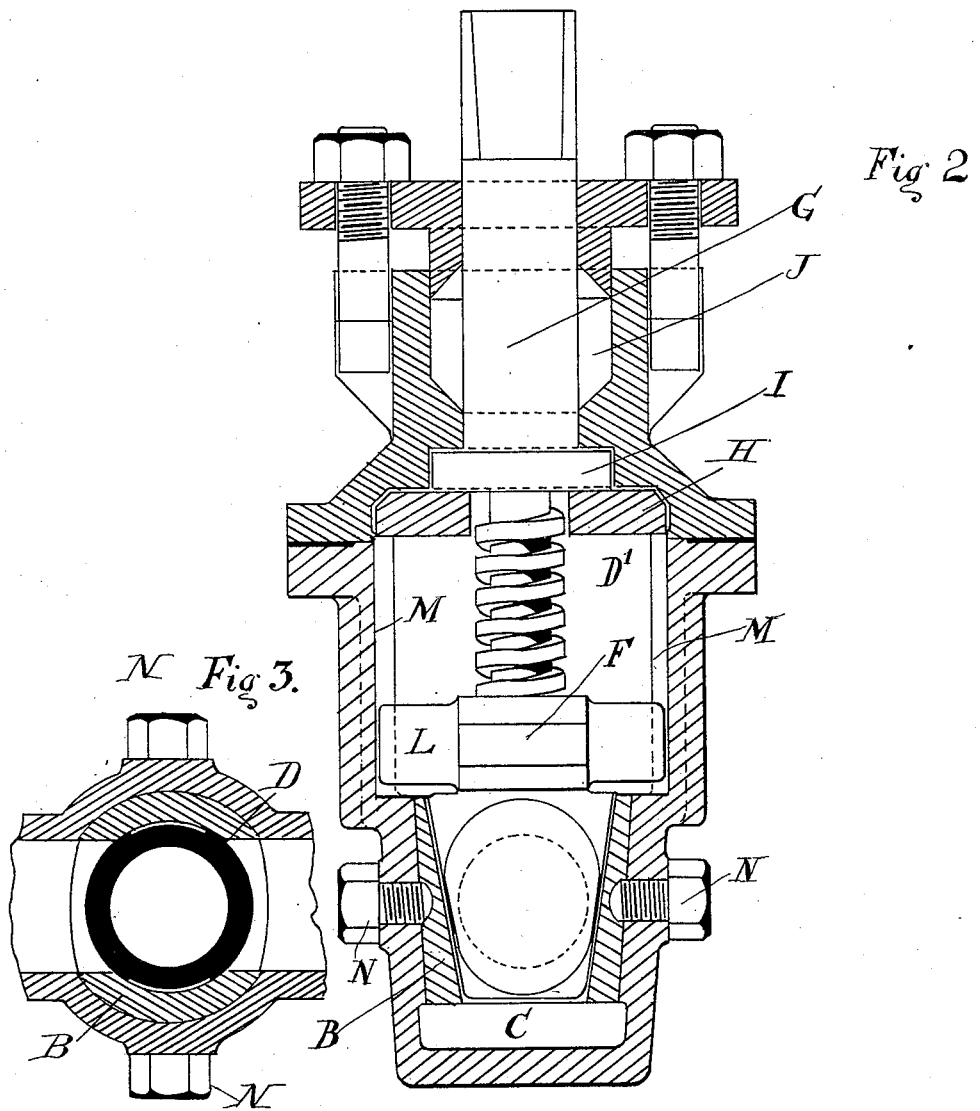

UNITED STATES PATENT OFFICE.

CHARLES JONES, OF LIVERPOOL, ENGLAND.

HYDRANT, STOP-VALVE, OR THE LIKE.

SPECIFICATION forming part of Letters Patent No. 601,967, dated April 5, 1898.

Application filed May 22, 1897. Serial No. 637,755. (No model.)

*To all whom it may concern:*

Be it known that I, CHARLES JONES, a subject of the Queen of Great Britain, residing at Liverpool, in the county of Lancaster, England, have invented certain new and useful Improvements in Hydrants, Stop-Valves, or the Like, of which the following is a specification.

This invention has for its object a hydrant or screw-down valve which shall be less liable to get out of order and far more efficient than those at present in use. It is best described by aid of the accompanying drawings, in which—

Figure 1:
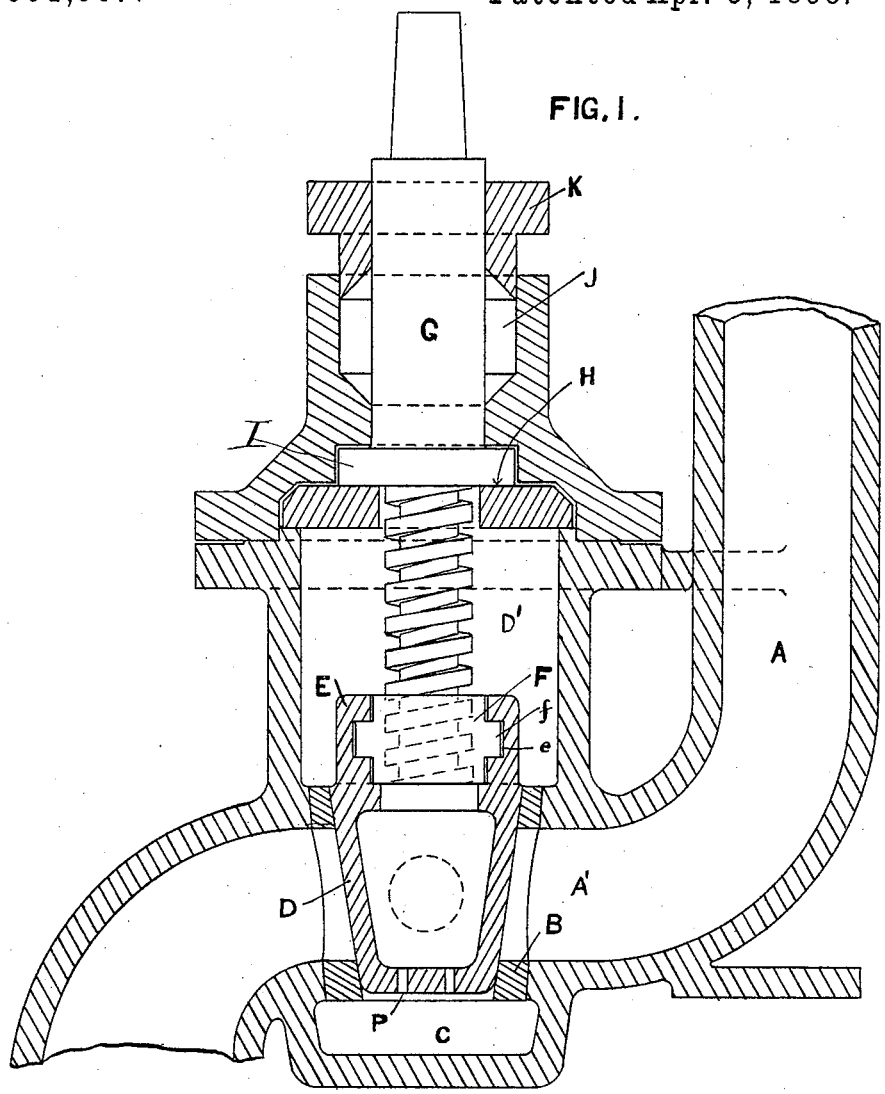
Figure 4:
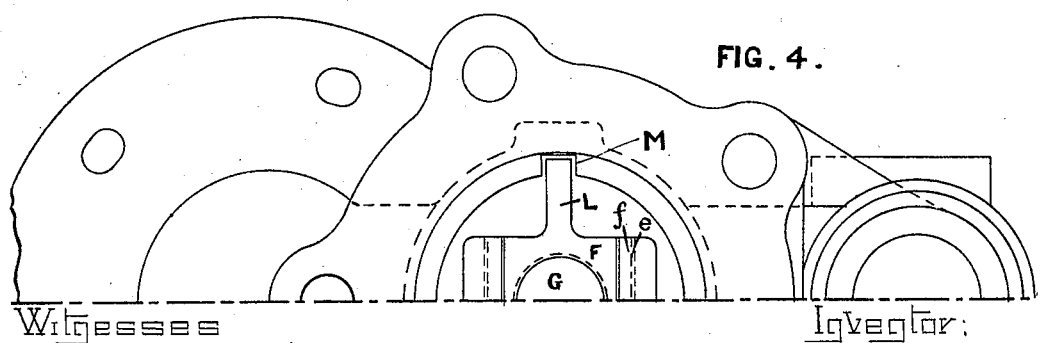

Figure 1 is a longitudinal section of the valve and contiguous pipe; Fig. 2, a vertical section of the same with the screw and nut in elevation; Fig. 3, a horizontal section through the center of the plug, and Fig 4 a half-plan view.

In the drawings, A is the pipe or conduit, carrying the water, steam, air, or other fluid and having a portion horizontal at A'; B, a conical valve-seat; C, a space cut out below the valve-seat and valve, so as to allow the valve to be reground several times without coming against the bottom, and D a conical valve. The surface of this valve is formed, preferably, with a face only in those parts which are opposite and immediately surrounding the conduit A', so as to form a joint, the other parts of the surface not being in contact with the seat. The valve-surface may also be cut away at that central part which faces the pipe or conduit A', though this is not shown on the drawings, in fact any of those portions which are never likely to come opposite the seat through the wearing away or lowering of the face of the valve.

D' is the chamber, placed above the valve; E, a projection on top of the valve projecting into this chamber. This has embayments *e* to hold corresponding projections *f* in the nut hereinafter described, through which works a screw for raising and lowering the valve. These embayments and projections are parallel with each other, so that the nut can be slid in between them sidewise.

F is the nut, having projection *f* fitting into the groove *e* of the bracket. It is obvious that a groove in the nut and a projection on the bracket would accomplish the same result. This nut has parallel faces corresponding to those of the brackets E of the valve.

G is the usual spindle, screwed through this nut. The nut itself has projecting wings L entering vertical grooves M in the chamber D', which prevent it from revolving. It will be noticed that the valve D is made hollow, so as to allow the valve to rise on the spindle without the end of the spindle coming in contact with the valve.

H is the thrust-washer, bearing on the top of chamber D'. Against the other side of H the collar I bears.

J is the usual stuffing-box, and K the usual gland.

The mode of action is as follows: Spindle G being turned revolves in nut F and causes the latter to rise or descend vertically, as the case may be, carrying the valve with it. The nut F and valve D are, however, in the drawings shown at their lowest point. Both valve and nut are prevented from rotating, the nut by the two wings L working in grooves M in the sides of chamber D' and the valve through its bracket E embracing the sides of nut F. The nut is also prevented from having vertical movement independent of valve D through the projection *f* holding into the groove *e*. There is preferably, however, a small play between these projections L and grooves M and also between the bracket E of the valve and the nut F, so as to enable the valve to accommodate itself to the seat when being held askew through any irregularity in the spindle. The valve-seat B is also held in place and prevented from rising with the valve by set-screws N. The conical valve is quickly ground to its seat owing to there being only a comparatively small surface in contact, while there being a hiatus under the valve it can be repeatedly turned up and reground before becoming too small. In order to prevent a water-cushion impeding the valve from coming tight against its seat, I prefer to perforate the valve at the bottom with perforations P, as shown in Fig. 1.

In the foregoing I have only mentioned a vertical spindle. It is obvious, however, that the spindle and the entire device can be placed at any angle. Further, any arrangement whereby the spindle can raise and lower the valve while the latter is held from turning and yet is free to adjust itself to the seat can be used instead of the exact device shown, provided the arrangement be such that the valve can be ground in its seat.

Among the advantages which I hope to gain from this invention are the following:

Less risk of breakage in handling.

The valve may be screwed down hard without damage.

There is no sensible wear on the faces, as they do not grind on each other, as is the case with screw-down valves, in which the valve rotates on its seat. Consequently the only wear will be from erosion.

As the cost of breaking up the streets to lay down hydrants is generally very greatly in excess of the cost of the hydrants themselves, it is obvious that great economy must ensue from a much more durable valve, even though the first cost of the valve be greater.

I declare that what I claim is—

1. In a hydrant or stop-valve, the combination with the shell or casing, of a conical valve-seat locked or retained therein by lateral set-screws; a cone valve having relief-holes formed in its lower end; a nut carried freely by the upper end of the valve; and a stem or rod working in said nut for raising and lowering the same and the valve, substantially as described.

2. The combination in a hydrant or stop-valve, of shell or casing, a chamber C formed in the lower part thereof, a conical valve-seat mounted in the shell above said chamber, set-screws extending through the shell and holding the seat in place, a chamber D' above the seat, a conical valve provided with openings in its lower end, a nut loosely mounted in the upper end of said valve, a rotary screw-spindle engaging said nut, and means for preventing endwise movement of the spindle.

3. The combination in a hydrant or stop-valve, of a shell or casing, a chamber C formed in the lower part of the casing, a conical valve-seat mounted in the shell above said chamber, set-screws extending through the shell and holding the seat in place, a chamber D' above the seat, a conical valve provided with openings P in its lower end, a nut F having wings $f$ extending into recess $e$ said recess being of such size as to allow a limited play of the parts, a screwed spindle engaging said nut, means for holding said spindle against endwise movement, and means for guiding and holding the nut and valve against rotation as they are raised and lowered.

In testimony whereof I have signed my name to this specification in the presence of two subscribing witnesses.

CHARLES JONES.

Witnesses:
W. P. THOMPSON,
W. H. BEESTON.